United States Patent
Buchanan

(10) Patent No.: US 10,010,854 B2
(45) Date of Patent: Jul. 3, 2018

(54) PLASMA REACTOR FOR LIQUID AND GAS

(71) Applicant: Ion Inject Technology LLC, Lenexa, KS (US)

(72) Inventor: Walter Riley Buchanan, Lenexa, KS (US)

(73) Assignee: Ion Inject Technology LLC, Lenexa, KS (US)

( * ) Notice: Subject to any disclaimer, the term of this patent is extended or adjusted under 35 U.S.C. 154(b) by 0 days.

(21) Appl. No.: 15/277,093

(22) Filed: Sep. 27, 2016

(65) Prior Publication Data

US 2017/0095788 A1    Apr. 6, 2017

Related U.S. Application Data

(60) Provisional application No. 62/235,750, filed on Oct. 1, 2015.

(51) Int. Cl.
*B01J 19/08* (2006.01)

(52) U.S. Cl.
CPC ...... *B01J 19/088* (2013.01); *B01J 2219/0809* (2013.01); *B01J 2219/0884* (2013.01); *B01J 2219/0894* (2013.01)

(58) Field of Classification Search
None
See application file for complete search history.

(56) References Cited

U.S. PATENT DOCUMENTS

| | | | |
|---|---|---|---|
| 4,283,291 A | 8/1981 | Lowther | |
| 4,399,016 A | 8/1983 | Tsukada | |
| 5,311,419 A | 5/1994 | Shires | |
| 5,387,842 A | 2/1995 | Roth et al. | |
| 5,399,832 A | 3/1995 | Tanisaki et al. | |
| 5,414,324 A | 5/1995 | Roth | |
| 5,872,426 A | 2/1999 | Kunhardt et al. | |
| 5,900,103 A | 5/1999 | Tomoyasu et al. | |
| 5,959,412 A | 9/1999 | Ushijima | |
| 6,005,349 A | 12/1999 | Khnhardt et al. | |
| 6,105,518 A | 8/2000 | Robson et al. | |
| 6,118,218 A | 9/2000 | Yializis et al. | |
| 6,147,452 A | 11/2000 | Kunhardt et al. | |
| 6,170,668 B1 | 1/2001 | Babko-Malyi | |
| 6,208,529 B1 | 3/2001 | Davidson | |
| 6,429,400 B1 | 8/2002 | Sawada | |
| 6,433,480 B1 | 8/2002 | Stark et al. | |
| 6,441,553 B1 | 8/2002 | Yializis | |
| 6,489,585 B1 | 12/2002 | Nakamura et al. | |
| 6,633,109 B2 | 10/2003 | Falkenstein | |

(Continued)

OTHER PUBLICATIONS

"International Search Report and Written Opinion", International Application No. PCT/US2016/053919, dated Dec. 23, 2016.

(Continued)

*Primary Examiner* — Kishor Mayekar

(74) *Attorney, Agent, or Firm* — Law Office of Mark Brown, LLC; Mark E. Brown

(57) ABSTRACT

A system for performing treatment of a liquid by ionized gas comprises a laminar flow liquid gas plasma reactor. The plasma reactor includes electrodes, an upper and lower flow spreader, and a housing. The reactor uses gas to form a gas zone above the liquid where the gas is ionized directly above and in direct contact with the liquid. The ionized gas reacts with the liquid to form an effluent.

16 Claims, 6 Drawing Sheets

(56) References Cited

U.S. PATENT DOCUMENTS

| | | |
|---|---|---|
| 6,664,737 B1 | 12/2003 | Berry et al. |
| 6,773,335 B2 | 8/2004 | Yanobe et al. |
| 6,818,193 B2 | 11/2004 | Christodoulatos et al. |
| 6,826,222 B2 | 11/2004 | Hill |
| 6,853,138 B1 | 2/2005 | Park et al. |
| 6,946,793 B1 | 9/2005 | Nelson |
| 7,098,420 B2 | 8/2006 | Crow et al. |
| 7,215,697 B2 | 5/2007 | Hill |
| 7,221,102 B2 | 5/2007 | Kotani et al. |
| 7,273,995 B1 | 9/2007 | Manz et al. |
| 7,399,944 B2 | 7/2008 | DeVries et al. |
| 7,507,934 B2 | 3/2009 | Kondou et al. |
| 7,764,140 B2 | 7/2010 | Nagarkatti et al. |
| 8,089,026 B2 | 1/2012 | Sellers |
| 8,093,758 B2 | 1/2012 | Hussman |
| 8,542,076 B2 | 9/2013 | Maier |
| 8,633,782 B2 | 1/2014 | Nagarkatti et al. |
| 8,710,926 B2 | 4/2014 | Nagarkatti et al. |
| 9,106,313 B2 | 8/2015 | Ueki |
| 9,287,800 B2 | 3/2016 | Hruska et al. |
| 9,394,189 B2 | 7/2016 | Hruska et al. |
| 9,419,581 B2 | 8/2016 | McKinzie |
| 9,420,679 B2 | 8/2016 | Cheung et al. |
| 9,692,392 B2 | 7/2017 | Cabanillas et al. |
| 9,698,748 B2 | 7/2017 | Manssen et al. |
| 9,736,920 B2 | 8/2017 | Smith et al. |
| 2002/0000019 A1 | 1/2002 | Park et al. |
| 2003/0039297 A1 | 2/2003 | Wittle et al. |
| 2003/0067273 A1 | 4/2003 | Benjamin et al. |
| 2004/0084382 A1 | 5/2004 | Ryazanova et al. |
| 2004/0094401 A1 | 5/2004 | Carlow |
| 2004/0183461 A1 | 9/2004 | Kane et al. |
| 2005/0260354 A1 | 11/2005 | Singh et al. |
| 2006/0097811 A1 | 5/2006 | Nakamura et al. |
| 2006/0150911 A1 | 7/2006 | Miyairi et al. |
| 2006/0208650 A1 | 9/2006 | Kondou |
| 2008/0060579 A1 | 3/2008 | Hsieh |
| 2008/0159925 A1 | 7/2008 | Shimizu et al. |
| 2008/0292497 A1 | 11/2008 | Vangeneugden et al. |
| 2009/0153279 A1 | 6/2009 | Chen |
| 2010/0123502 A1 | 5/2010 | Bhutta et al. |
| 2010/0171428 A1 | 7/2010 | Kirchmeier et al. |
| 2010/0219757 A1 | 9/2010 | Benzerrouk et al. |
| 2011/0241798 A1 | 10/2011 | Hong et al. |
| 2012/0020844 A1 | 1/2012 | Foret |
| 2012/0250370 A1 | 10/2012 | Taniguchi et al. |
| 2012/0262064 A1 | 10/2012 | Nagarkatti et al. |
| 2012/0284437 A1 | 11/2012 | Johnson |
| 2013/0194224 A1 | 8/2013 | Lai |
| 2014/0178604 A1 | 6/2014 | Selwyn |
| 2014/0246364 A1* | 9/2014 | Hruska ............... C01B 13/11 |
| | | 210/143 |
| 2014/0246381 A1 | 9/2014 | Buchanan et al. |
| 2015/0022795 A1 | 1/2015 | Coenen et al. |
| 2016/0028311 A1 | 1/2016 | Murakami |
| 2016/0030910 A1 | 2/2016 | Biberger et al. |
| 2016/0194224 A1 | 7/2016 | Buchanan et al. |
| 2016/0197564 A1 | 7/2016 | Buchanan et al. |

OTHER PUBLICATIONS

"International Search Report and Written Opinion", PCT/US2014/016730, dated Jul. 4, 2015, pp. 1-18.

* cited by examiner

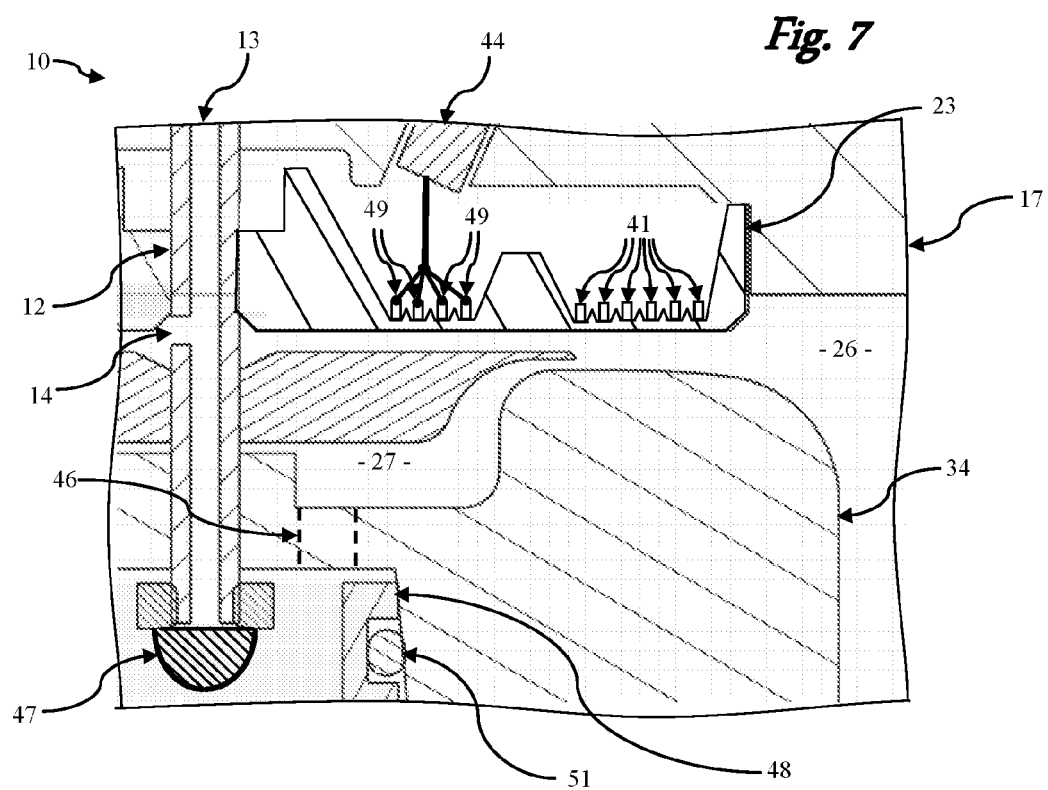

PLASMA REACTOR FOR LIQUID AND GAS

BACKGROUND OF THE INVENTION

Field of the Invention

Embodiments of the current invention relate to plasma reactors and methods and systems that utilize plasma reactors.

Description of the Related Art

Plasma reactors may include at least two electrodes which are spaced apart. Typically, a voltage difference is applied to the electrodes and an electric field is established between them. A stream of gas may be introduced to the space between the electrodes such that it passes through the electric field. Exposure to the electric field generally ionizes the gas and creates a plasma. If a stream of liquid is also introduced to the space between the electrodes, the gas and liquid may form two layers flowing in parallel and a plasma may form in the gas and at the surface of the liquid and further, the ions resulting from the plasma may be injected into, or may otherwise enter into the liquid as it passes through the electric field. Plasma injection into liquid may be utilized for applications such as: in-line liquid hydrocarbon fuel reforming for hydrogen enrichment to improve the fuel economy of internal combustion engines; nitrogen fixing by direct nitrogen ion injection into water; destruction of high molecular weight hydrocarbons (proteins and pharmaceuticals) in drinking water; ammonia/nitrate sequestering for treatment of high nitrate content water; demineralization (water softening) for consumer and industrial markets; nitrification of water for agricultural use; ph modification of liquid streams; disinfection, oxygen and ozone injection; and other similar applications;.

In previous reactors that utilize gas and liquid, an eductor design was described (U.S. Pat. Nos. 9,287,800 and 9,394,189B2, Buchanan et al.) which utilized a low pressure zone created by an eductor to enhance the introduction of gas into the reactor and enhance the creation of the plasma all around the area between the first electrode and the liquid. This new and novel laminar flow reactor allows for an increased area of plasma generation with the illumination of the need to adhere to the physical characteristics of an eductor. This new and novel design forces gas into the reactor creating a relatively high pressure zone of gas above the liquid, the area of plasma generation can be greatly extended and the effectiveness of the system enhanced. In addition, previous eductor based reactors required the second electrode be in close proximity and directly in contact with the liquid. In this reactor, the second electrode may contact the liquid but also may be placed in close proximity or further away from the first electrode. In systems where the liquid needs to be electrically isolated from the electrode, the second electrode may be dielectrically isolated from the liquid by a non-conductive layer.

SUMMARY OF THE INVENTION

A first embodiment of the current invention provides a plasma laminar flow reactor comprising a housing, an electric field generator, an upper flow spreader, and a lower flow spreader. The housing may include an internal reactor chamber, a gas inlet port, and liquid inlet and liquid outlet ports. The electric field generator may include a first electrode, an optional pre-ionization electrode and a spaced apart second electrode and may generate an electric field or electric fields there between. The first electrode and optional pre-ionization electrode may be composed of one or more than one concentric shapes. A second electrode may have a shape similar to the first or another shape depending on the application and the electrical nature of the liquid passing through the reactor. The second electrode may be spaced close to or spaced farther from the first electrode. In cases where the second electrode is not in close proximity to the first electrode, the second electrode may have any shape convenient to the design. Together, the first and second electrodes may produce a cylindrical electrical field close to the first electrode. The optional pre-ionization electrode may produce an electric field in close proximity to the field produced b y the first electrode and second electrode. The plasma laminar flow reactor may also include a dielectric element positioned between the first electrode, the optional pre-ionization electrode and second electrodes adjacent to the first electrode and optional pre-ionization electrode. The upper flow spreader may supply a stream of gas and liquid to the reactor chamber and may be positioned within the reactor chamber concentrically with the first electrode and the optional pre-ionization electrode. The lower flow spreader may supply a base for the stream of liquid as it flows to the reactor chamber and may be positioned within the reactor chamber concentrically with the first electrode and the upper flow spreader. The gas may create a gas zone inside the reactor chamber. The stream of liquid and the stream of gas may flow adjacent one another radially outward from the center of the reactor chamber and pass through the electric field. This may allow the gas and liquid to create and maintain two layers (gas over liquid) as the gas and liquid pass through the electric field. The gas may be injected from a relatively higher pressure gas source than the liquid through a flow limiting valve, small pump either as a steady flow or pulsed on and off, or other means well known to those familiar with gas control systems, such that the gas zone above the liquid is maintained.

A second embodiment of the current invention provides for an alteration of the second electrode by adding a dielectric isolation between the second electrode and the liquid. This may enable complete electrical isolation of the drive electronics and the liquid and gases to be used in the reactor. In addition, this may allow for plasma reactors without any conductive elements contacting the liquid.

A third embodiment of the current invention provides an alteration to the first electrode, the pre-ionization electrode and or second electrode that can be used to modify the electrical characteristics of the reactor. This may enable larger reactors and more flexibility in design. In this embodiment the electrode is broken into several smaller electrodes. This may allow the plasma area to be larger without a proportional increase in the capacitance of the first electrode. This may be desirable for the voltage generator. The number of first or second electrodes may depend on the needs of the reactor and the reaction desired.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 7 is the enlarged cross sectional view of a plasma reactor of FIG. 5 showing a reactor with multiple electrodes on the pre-ionizer and first electrode.

Figure 1:
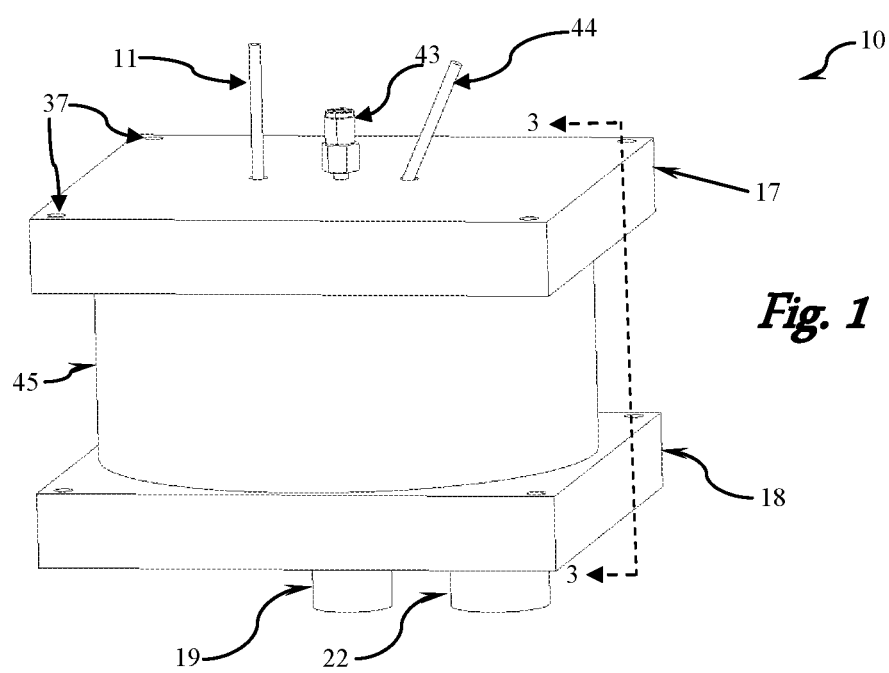
FIG. 1 is an isometric view of a plasma reactor constructed in accordance with various embodiments of the current invention.
Figure 2:
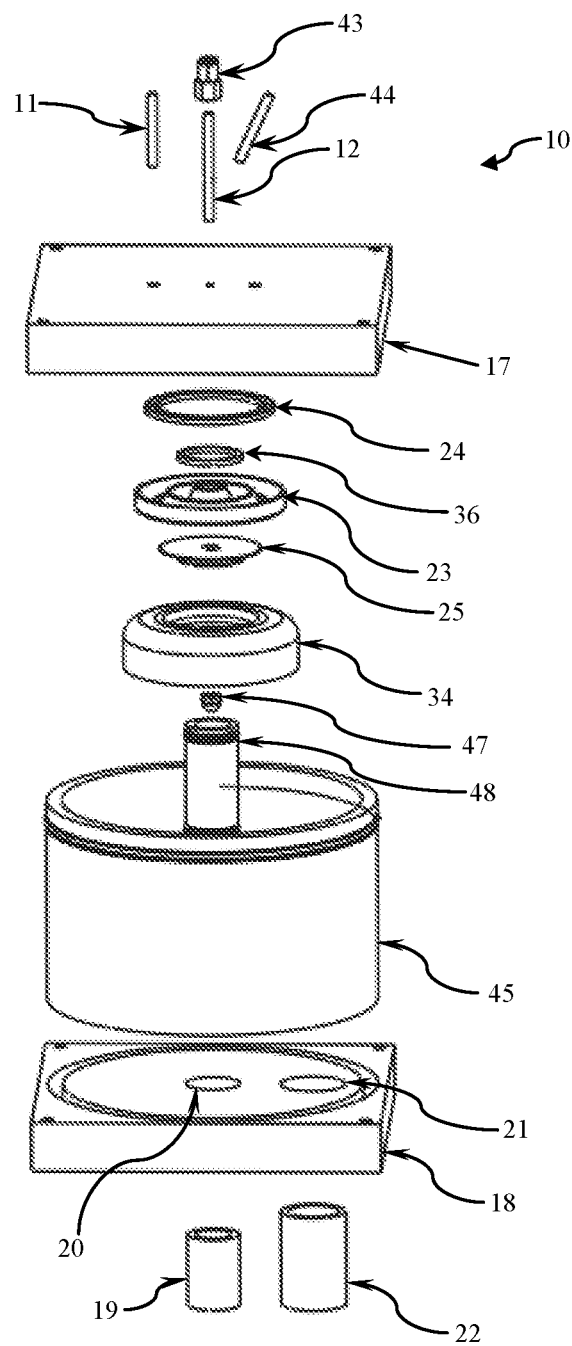
FIG. 2 is an exploded view of the plasma reactor of FIG. 1.
Figure 3:
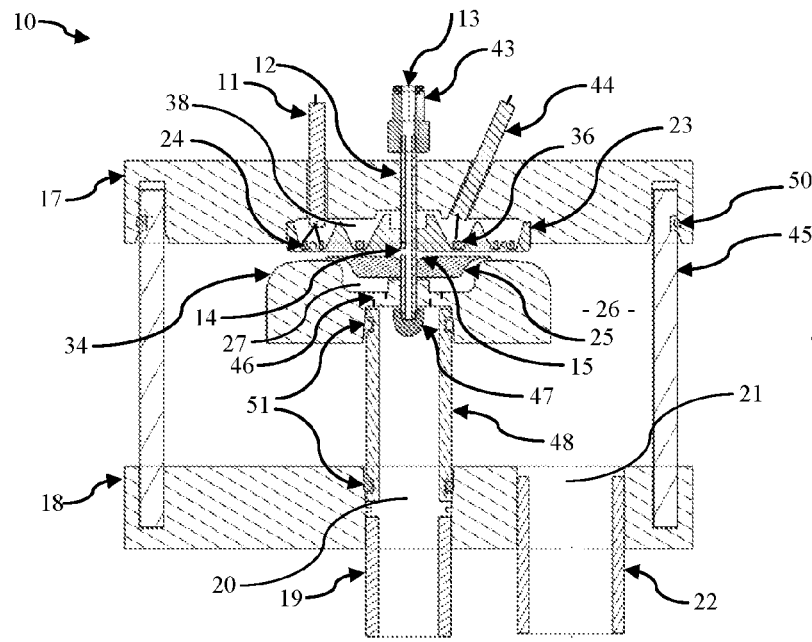
FIG. 3 is a cross sectional view of the plasma reactor of FIG. 1 cut along the line 3-3 of FIG. 1.
Figure 4:
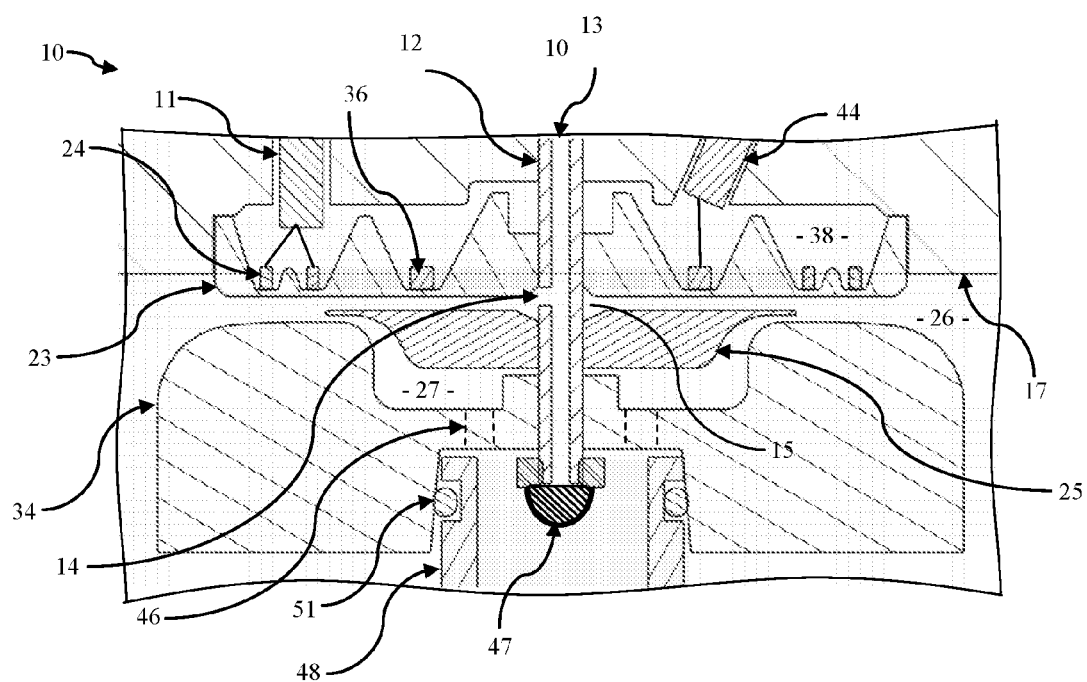
FIG. 4 is an enlarged cross sectional view of a plasma reactor from FIG. 3 highlighting the upper portion of a reactor chamber.
Figure 5:
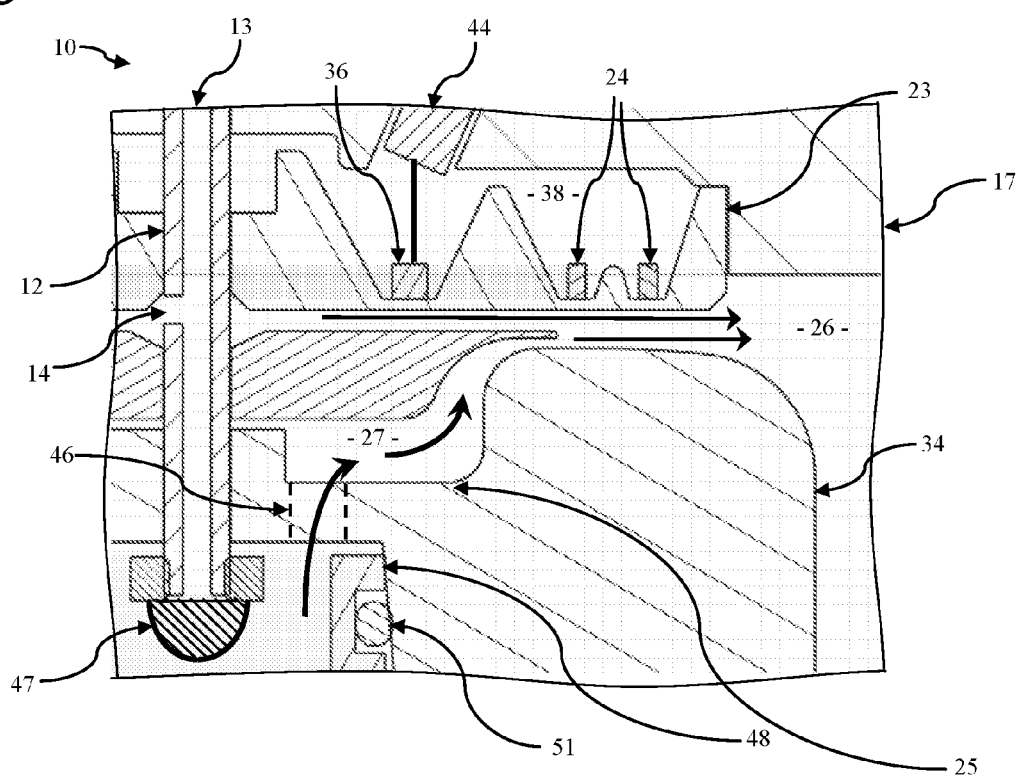
FIG. 5 is an enlarged cross sectional view of a plasma reactor showing gas and liquid flow paths.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to one embodiment", an embodiment", or "embodiments" mean that the feature or features being referred to are included in at least one embodiment of the technology. Separate references to one embodiment", an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Positional and directional terms, such as "upper", "top", "lower", "bottom", and the like, are used herein to describe various aspects of the current invention as shown in the accompanying figures. While the figures depict the invention in a particular orientation, the invention may be utilized in virtually any orientation. The relationship between the components established by the terms still applies when the invention is utilized in an orientation other than that shown in the figures.

Referring to FIGS. 1-5, a plasma reactor 10, constructed in accordance with at least a first embodiment of the current invention, is shown. The reactor 10 generally receives a gas, a liquid and electrical stimulus as inputs. The gas may be ionized to form a plasma over the liquid which is in contact with the liquid. The ionized gas interacts with the liquid to create an effluent or product. The plasma reactor 10 broadly comprises a lower housing 18, a housing wall 45, a upper housing 17, at least one dielectric element 23, an upper flow spreader 25, a lower flow spreader 34, first electrode(s) 24, and the second electrode which may be the lower flow spreader 34 or another second electrode configuration herein described, and a effluent chamber 26. The reactor may also include an optional pre-ionization electrode 36. An electric field generator may be attached to the first and second electrodes. In cases where an optional pre-ionization electrode is utilized, an electric field generator may be attached to the pre-ionization electrode. The plasma reactor 10 may also include a plurality of gaskets or seals, such as O-ring seals, that are positioned at the interfaces between various components of the reactor 10.

The housings 17, 18 and 45 generally retain the components of the plasma reactor 10, and its shape may be adapted to the system in which it is implemented. The housings may include additional components that adapt the plasma reactor 10 to the system in which it is implemented. In some embodiments, the housing may have a rounded shape with a plurality of sidewalls. The housings 17, 18 and 45 may also include aligned threaded and non-threaded holes 37 to allow for fasteners to assemble the housings 17 and 45 to the lower housing 18. In addition, the lower housing 18 may include a liquid inlet port 20 and a liquid outlet port 21 which may be connected to the liquid inlet tube 19 and liquid outlet tube 22 respectively. The housings and other components may be constructed from metals, plastics, ceramics, or the like.

The upper housing 17 generally retain the first electrode 24 and an optional pre-ionization electrode 36, high dielectric element 23 and alignment rod 12. The upper housing 17 may have a box shape with a plurality of sidewalls and an internal cavity 38 bounded by the sidewalls.

The internal cavity 38 may be filled with dielectric materials, ceramics, polymers, gases, or the like to provide electrical isolation and suppress undesirable corona discharge from the first electrode 24 to the upper housing 17 and alignment rod 12. The upper housing lid 17 may also have a second opening roughly centered on the housing to allow for a central alignment rod 12 to which the housing lid 17, dielectric element 23, upper flow spreader 25, second lower flow spreader 34, may be connected, thereby facilitating good alignment between the various reactor components. The alignment rod 12 may have a gas inlet hole 13 roughly centered in the rod which continues through the rod to the gas inlet port 14 which may allow gas to pass through the port into the gas inlet chamber 15. The alignment rod 12 may be made of electrically conductive material which may allow the use of the alignment rod 12 to electrically contact the lower spreader 34. The lower spreader 34 may be made of conductive material and act as the second electrode, or may be made from electrically nonconductive materials which may require an alternate second electrode configuration described herein. The use of the lower spreader 34 as an electrode, or an alternate second electrode configuration may depend on the type of liquid and gas reaction desired, or other design considerations.

An optional gas pre-ionization electrode 36 may be included to enable the gas entering the reactor to be ionized prior to entering the reactor chamber 26. This may result in a greater degree of gas ionization. In these cases the upper flow spreader 25 may be made of material such as ceramics or metals that pass the electric field to the area generally under the pre-ionization electrode 36. The pre-ionization electrode 36 may be connected to a second electrical source, or use the same source as the first electrode 25. In some cases the first electrode may simply be extended over the upper flow spreader 25 to facilitate this function. This pre-ionization electrode 36 may not be required in all reactors and is optional depending on the reactor requirements.

The first electrode 24 and lower flow spreader 34 or alternate second electrodes may be spaced apart, and the electric field may exist between the two components. Both components 24 and 34 or alternate second electrode may be connected to an external voltage supply which controls the characteristics of the electric field. The voltage supply may provide a plasma generating voltage up to 150 kV of pulsed DC, AC or other wave form used to create a plasma. In various embodiments, the first electrode 24 and optional pre-ionization electrode 36 may be connected to a variable voltage through the wire 11 and 44 respectively, while the lower flow spreader 34 may be connected as a second electrode or alternate second electrode may be connected to an electrical ground or neutral through the alignment rod. The first electrode 24 may be annular or ring-shaped, although other shapes are possible, and may be constructed from a metal, such as iron, nickel, gold, copper, alloys thereof, or the like. The first electrode 24 may be located in the internal cavity 38 and may be isolated from the reactor chamber 26 by the dielectric element 23. The lower flow spreader 34 or alternate second electrode may be generally cylindrically shaped and attached to the alignment rod. In some applications the location of the second electrode may not be critical and the second electrode may be placed as convenient for the design of the reactor farther away from the first electrode 12. In some embodiments where the liquid may not be electrically conductive, or for other process purposes the second electrode may be shaped the same as the first electrode 24 and is positioned to align with the first electrode within the body of a nonconductive lower spreader 34, as described in more detail below. Given the shapes and orientation of the first electrode 24, pre-ionization electrode 36 and lower flow spreader 34 or alternate second electrode, the electric field generated may be roughly cylindrical in shape and positioned roughly below the respective electrode.

The dielectric element 23 generally provides an insulating gap across which at least a portion of the electric field is established. The dielectric element 23 may be planar and disc-shaped, although other shapes are possible, and may be constructed from insulating dielectric material well know in this field such as ceramics, polymers, or the like. In addition, the first electrode 24 and optional pre-ionization electrode 36 may be plated, deposited, bonded, glued, or otherwise affixed to the upper surface of the dielectric element 23.

The upper flow spreader 25 generally allows the gas to enter the reactor chamber 26 through gas inlet port 13, alignment rod 12 gas outlet port 14 and gas inlet chamber 15 in a roughly radial pattern between the upper flow spreader and the dielectric element 23 and allows liquid to flow roughly evenly in a radial pattern over the lower flow spreader into the reactor chamber 26. The upper flow spreader 25 may have a generally conical shape with a with a center hole which may allow the upper flow spreader to be mounted on the alignment rod 12.

The lower surface of the upper spreader 25 and upper surface of the lower spreader 36 may create a liquid inlet chamber 27 and may be shaped such that the liquid entering the liquid inlet chamber from the inlet coupler 48 through the water inlet opening 46 exits the inlet chamber 27 radially outward on the surface of the lower spreader 34 into the reactor chamber 26.

At the first upper end of the upper flow spreader 25 the inner surface may be enlarged away from the alignment rod 12 and may create a gas inlet chamber 15. The alignment rod 12 may be hollow to facilitate the passage of gas from the inlet port and may have an opening forming a gas outlet port 14 near the gas inlet chamber 15 which may allow gas to flow through the alignment rod into the gas inlet chamber 15. The lower end of the alignment rod 12 may have the gas blocked with a cap nut 47 or other means such that the gas may not pass through the alignment rod to the inlet coupler 48.

The upper flow spreader 25 may be positioned opposite the dielectric element 23, such that there is a small space between the lower surface of the dielectric element 23 and a top of the upper flow spreader 25. The upper flow spreader 25 may also be positioned concentrically with the first electrodes 24 and optional pre-ionization electrode 36. Gas may flow into gas chamber 15 and may flow radially out to the reactor chamber 26.

The combination of the upper flow spreader 25 and the lower flow spreader may also facilitate the flow of liquid from the liquid inlet chamber 27 to the reactor chamber 26. The inner area of the lower flow spreader 34, in combination with the lower surface of the upper flow spreader 25, may generally establish a radial flow pattern for the liquid before entering the reaction chamber 26. The lower flow spreader 34 may have a generally cylindrical shape with a circumferential sidewall. The upper flow spreader 25 may be positioned within the hollow interior of the housing wall 45, such that the upper flow spreader 25 is concentric with the lower flow spreader 34. There may a space between the outer surface of the upper flow spreader 25 and the lower flow spreader 34 which forms a liquid passageway. Accordingly, this liquid passageway may allow the liquid to flow from the liquid inlet chamber 27 to the reactor chamber 26. The top edge of the lower flow spreader 34 may be flat, rounded, arcuate, curved between the inner surface and the outer surface or tapered from the inner surface to the outer surface.

The bottom edge of the lower flow spreader 34 may be closed except for a one or more liquid inlet openings 46 which may facilitate the flow of a liquid from the liquid inlet port 19 through the inlet port 20 and inlet connection tube 48 into the liquid inlet chamber 27. The lower housing 18 may further include one or more liquid inlets 20, and liquid inlet tube 19 that supply liquid to the reactor 10.

Furthermore, the combination of the dielectric element 23, the upper flow spreader 25, and the lower flow spreader 34 may create a gas flow and a parallel liquid flow where the gas is maintained at slightly greater pressure than the liquid thereby maintaining a gas zone between the high voltage dielectric and the liquid. By maintaining this positive pressure differential, the area of plasma generation may be extended significantly over previous designs.

In some embodiments, the lower flow spreader 34 only may be constructed from electrically conductive materials, such as metals. In such embodiments, the lower flow spreader 34, particularly the upper edge, may form the second electrode. In other embodiments, the lower flow spreader 34 may be constructed from non-conductive materials, such as plastics or ceramics. With these embodiments, the second electrode may be formed either by the alignment rod 12, the cap nut 47 a second annular electrode made of electrically conductive material located at the top of the lower spreader generally below the first electrode, or electrically isolated by a second electrode dielectric from the liquid. In cases where the liquid is conductive to AC waveforms, the location of the second electrode may be remote and even outside the reactor 10 using such things as a conductive liquid outlet or inlet tube 19 and 22 connected to ground or neutral.

The reactor chamber 26 generally provides a setting for the gas to be ionized while in the general area generally under the dielectric element 23 and first electrode 24 and reacted with the liquid. The reactor chamber 26 may include an outer surface and an inner surface. The outer surface may be bounded by the lower surface of the dielectric element 25, the lower surface of the upper housing 17, and the inner surface of the housing wall 45, and the upper surface of the lower housing 18. The inner surface may be bounded by the outer edge of the upper flow spreader, the outer edge of the lower flow spreader 34, and the outer surface of the inlet coupler 48.

The plasma reactor 10 may operate as follows; the liquid inlet tube 19 may be coupled to an external pressurized liquid source which may be pressurized between 2 and 300 pounds per square inch gauge (psig). The gas inlet 13 in the alignment rod 12 may be coupled to an external pressurized gas source, and the gas may be supplied at a positive pressure relative to the liquid source pressure and the gas flow rate into the gas inlet 13 may be somewhat controlled.

The gas may flow from the gas inlet 13 into the alignment rod 12 and through the alignment rod 12 through the gas inlet port 14 into the gas inlet chamber 15. From here the gas may flow from the gas inlet chamber 15 between the upper flow spreader 25 and the high voltage dielectric 23 radially outward into the reaction chamber 26, thereby creating a gas layer.

As the gas passes through the electric field, a plasma may be created which ionizes the gas and converts it into a stream of plasma with roughly laminar flow with the liquid. The characteristics of the electric field may be controlled by the external voltage supply which may provide a plasma generation voltage of up to 150 kV AC, pulsed DC or other electrical plasma generating sources familiar to those in the industry. The strength of the electric field is generally the greatest at the shortest distance between the first electrode 24 and the surface, slightly below the surface of the liquid, or the second electrode 29, which may be generally below the first electrode 24.

The liquid may flow from the liquid inlet tube 19 through inlet 20 and inlet coupler 48 through the liquid inlet openings 46 in the lower spreader into the liquid inlet chamber 27. Given the curvature of the bottom of the flange 39 and the curvature of the top edge of the lower flow spreader 34, the liquid may exit the liquid inlet flow chamber 27 and flow radially outward in the channel formed by the upper flow spreader 25 and the lower flow spreader 34 into the reactor chamber 26. The liquid may then flow through the electric field with the gas as a stream with roughly laminar flow. The gas may flow on top of the liquid stream through the electric field forming a plasma. As the liquid and the plasma flow through the electric field, some of the ions created in the plasma and some other non-ionized gas may react or otherwise enter the liquid to create a stream of effluent. The effluent flows outward from the center of the reactor 10 and is collected toward the bottom of the reactor chamber 26. The effluent may exit the plasma reactor 10 through the liquid outlet port 21 located at the bottom of the reactor chamber 26 and into the liquid outlet tube 22.

Figure 6:
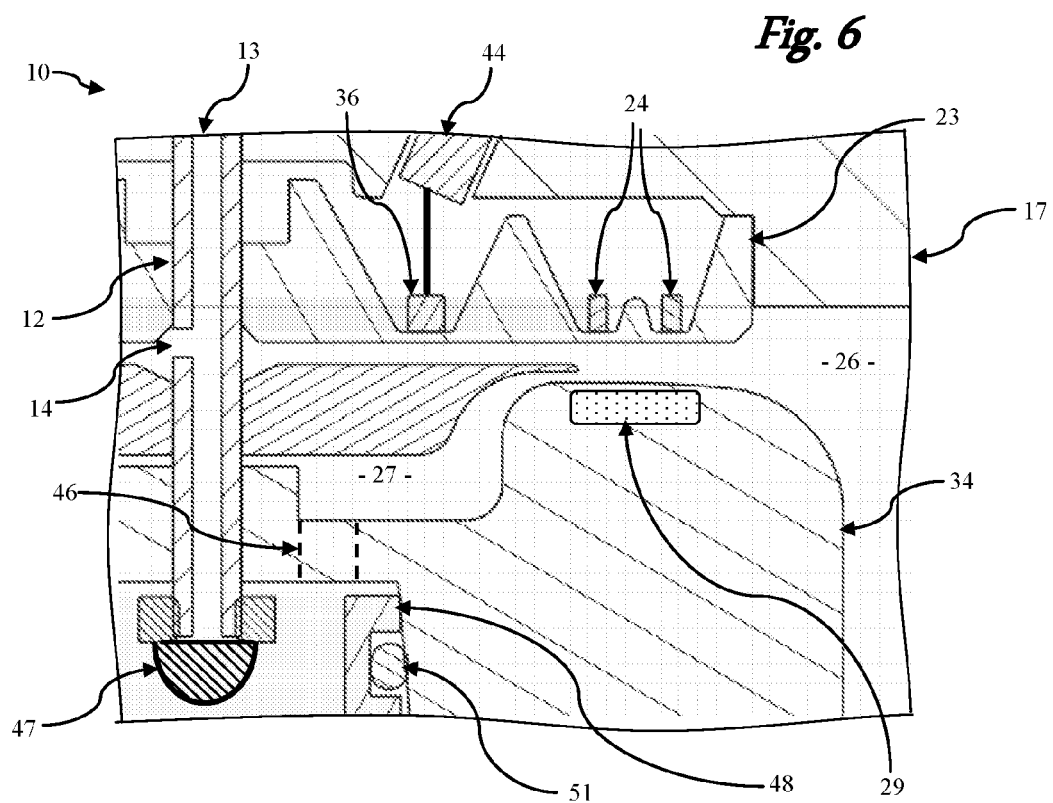
FIG. 6 is the enlarged cross sectional view of a plasma reactor of FIG. 5 showing the second embodiment of the plasma reactor showing a dielectrically isolated second electrode.

Referring to FIG. 6, a second embodiment of the reactor utilizes a dielectrically isolated second electrode 29. In some applications which may include oxygen and ultra high purity water, it may be desirable to avoid any liquid contact with metallic elements or elements that are conducting electricity. Other applications where this is desirable may include applications where the liquid is not able to be connected to an electrical potential. There are other applications that may benefit from a dielectric isolation not listed here. In these applications the second electrode may be dielectrically isolated from the liquid by using a second electrode 29. This electrode may be placed in the lower flow spreader 34 and covered with a material such as ceramic, polymer or other materials known those familiar with the art to isolate the alternate electrode 29 from the liquid stream. In these cases the electrical field will be shared by the dielectric element 23, the gas flow below the dielectric element, the liquid above the lower flow spreader 34 and the material used to isolate the alternate second electrode 29.

Referring to FIG. 7, a third embodiment of this reactor may split the first electrode into several alternate first electrodes 41. These alternate first electrodes 41 may be annular or other shapes and may be located in the internal cavity 38 and may be isolated from the reactor chamber 26 by the dielectric element 23. In addition this type of electrode may be used for alternate optional pre-ionization electrodes 49. By using multiple electrodes, the electrical characteristic of a reactor of a given size may be altered thereby enabling a greater plasma area without a corresponding increase in electrode capacitance and simplifying the design of the electrical source to drive the electric field required to generate a plasma. One or more first electrodes may be used in a given reactor. One or more optional pre-ionization electrodes may be used in a reactor. The use of a type of one or more first electrodes in a given reactor may depend on the reactor size and type of reaction desired or other considerations. The use of an optional pre-ionization electrode and the configuration of said optional pre-ionization electrodes also may depend on the type of reaction and other design considerations. The use of various configurations of first electrodes and configurations of optional pre-ionization electrodes are interchangeable.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A laminar flow plasma reactor comprising:
   a housing including a reactor chamber internal to the housing;
   an electric field generator including a first electrode and a second electrode spaced apart from said first electrode and configured to generate an electric field therebetween, wherein the first electrode is dielectrically isolated by a dielectric element, and wherein said electrodes are positioned in said reactor chamber;
   an upper flow spreader to supply a stream of gas to the reactor chamber, the upper flow spreader positioned within the reactor chamber concentrically with the first electrode;
   a lower flow spreader to supply a stream of liquid to the reactor chamber, the lower flow spreader positioned within the reactor chamber concentrically with the first and second electrodes and the upper flow spreader, wherein the stream of liquid and the stream of gas flow adjacent one another radially outward from a center of the reactor chamber and pass through the electric field;

a gas source to supply a flow of gas to the reactor at an equal or higher pressure than the pressure in the reactor chamber; and an alignment rod extending through the lower flow spreader, the upper flow spreader and the dielectric element.

2. The laminar flow plasma reactor of claim 1 wherein said alignment rod is electrically conductive.

3. The laminar flow plasma reactor of claim 1 wherein said alignment rod is configured to convey the gas from the reactor exterior to the interior.

4. The laminar flow plasma reactor of claim 1 wherein the upper flow spreader is cylindrical in shape with a circumference, a circumferential sidewall, a top surface and an outward extending flange at one end thereof wherein the stream of gas flows along the top surface.

5. The laminar flow plasma reactor of claim 1 wherein said lower flow spreader is cylindrical in shape with a circumference and a circumferential sidewall such that a sidewall of the upper flow spreader is positioned within the sidewall of the lower flow spreader and the stream of liquid flows between the two sidewalls.

6. The laminar flow plasma reactor of claim 1 wherein the lower flow spreader is the second electrode.

7. The laminar flow plasma reactor of claim 1 wherein the lower flow spreader contains the second electrode dielectrically isolated from the reactor chamber.

8. The plasma reactor of claim 1 wherein the second electrode is located remotely from the lower flow spreader.

9. The plasma reactor of claim 1 wherein the first electrode is separated into more than one electrode.

10. The plasma reactor of claim 1, wherein the first electrode is annular in shape and is positioned above the lower flow spreader and extends inward over the upper flow spreader.

11. The plasma reactor of claim 1, wherein the first and second electrodes ionize the gas to create a plasma adjacent to the liquid when driven by an appropriate external electrical source.

12. The plasma reactor in claim 1 wherein a pre-ionization electrode is positioned over the upper flow spreader and dielectrically isolated from the first electrode.

13. The plasma reactor of claim 12 wherein the pre-ionization electrode, the second electrode and the upper flow spreader ionize the gas to create a plasma adjacent to the upper flow spreader when driven by an appropriate external electrical source.

14. The plasma reactor of claim 1 wherein the pre-ionization electrode is separated into more than one electrode.

15. The plasma reactor of claim 1 wherein the pre-ionization electrode, the second electrode and the upper flow spreader ionize the gas to create a plasma adjacent to the upper flow spreader when driven by an appropriate external electrical source.

16. The plasma reactor of claim 1, wherein the gas and liquid exit the chamber at a bottom of the reactor chamber.

* * * * *